United States Patent

Winterhoff et al.

Patent Number: 6,053,504
Date of Patent: Apr. 25, 2000

[54] CLAMPING RING FOR FLANGE CONNECTIONS IN CABLE FITTINGS AND PIPES

[75] Inventors: Hans Winterhoff, Waldshut-Tiengen; Martin Behrendt, Hagen, both of Germany

[73] Assignee: RXS Kabelgarnituren GmbH, Hagen, Germany

[21] Appl. No.: 08/975,958

[22] Filed: Nov. 21, 1997

[30] Foreign Application Priority Data

Nov. 21, 1996 [DE] Germany .......................... 196 48 292

[51] Int. Cl.$^7$ .................................................... F16J 15/10
[52] U.S. Cl. ........................ 277/603; 277/609; 277/626; 24/274 WB; 24/285
[58] Field of Search ................ 24/274 WB, 285; 285/367, 365, 366, 407–411; 277/603, 609, 620, 621, 623, 626

[56] References Cited

U.S. PATENT DOCUMENTS

| | | | |
|---|---|---|---|
| 37,929 | 3/1863 | Warner ..................... | 285/408 |
| 85,392 | 12/1868 | McCullaugh ............... | 24/285 |
| 1,830,782 | 11/1931 | Burnish et al. ............ | 285/367 |
| 2,403,449 | 7/1946 | Meyer et al. .............. | 285/367 X |
| 2,842,385 | 7/1958 | Webster et al. ........... | 285/408 |
| 2,950,930 | 8/1960 | Dunmire ................... | 285/110 |
| 3,029,095 | 4/1962 | King et al. ............... | 285/411 |
| 3,129,021 | 4/1964 | Willis et al. ............. | 285/233 |
| 3,861,723 | 1/1975 | Kunz et al. ............... | 385/410 |
| 4,640,530 | 2/1987 | Abbes et al. .............. | 285/365 X |
| 5,059,748 | 10/1991 | Allen et al. . | |

FOREIGN PATENT DOCUMENTS

| | | | |
|---|---|---|---|
| 121911 | 7/1946 | Australia ................. | 285/411 |
| 511690 | 6/1952 | Belgium . | |
| 2079404 | 4/1993 | Canada ..................... | 285/408 |
| 0 236 141 | 9/1987 | European Pat. Off. . | |
| 1289990 | 2/1962 | France . | |
| 87004 | 4/1966 | France ...................... | 285/367 |
| 319534 | 3/1920 | Germany ................... | 285/366 |
| 851292 | 10/1952 | Germany ................... | 285/365 |
| 88 06 080 | 10/1988 | Germany . | |
| 44 27 513 | 2/1996 | Germany . | |
| 732442 | 6/1955 | United Kingdom . | |
| 866626 | 4/1961 | United Kingdom . | |
| 886036 | 6/1962 | United Kingdom . | |
| 901048 | 7/1962 | United Kingdom ........ | 285/365 |
| 2268239 | 1/1994 | United Kingdom ........ | 285/409 |

*Primary Examiner*—Anthony Knight
*Attorney, Agent, or Firm*—Hill & Simpson

[57] ABSTRACT

A clamping ring for a sealing system has a channel for receiving flanges of the pipe connections and seals is formed of a plurality of segments, which are pressed radially on the flanges by a strap retainer, which has an arrangement for tightening the retainer on the outer portions of the segments.

14 Claims, 2 Drawing Sheets

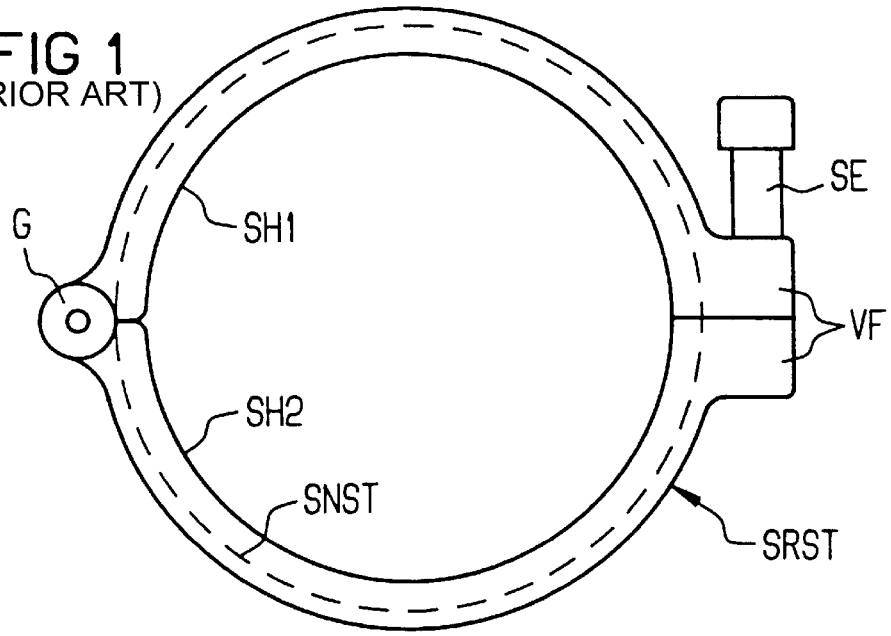
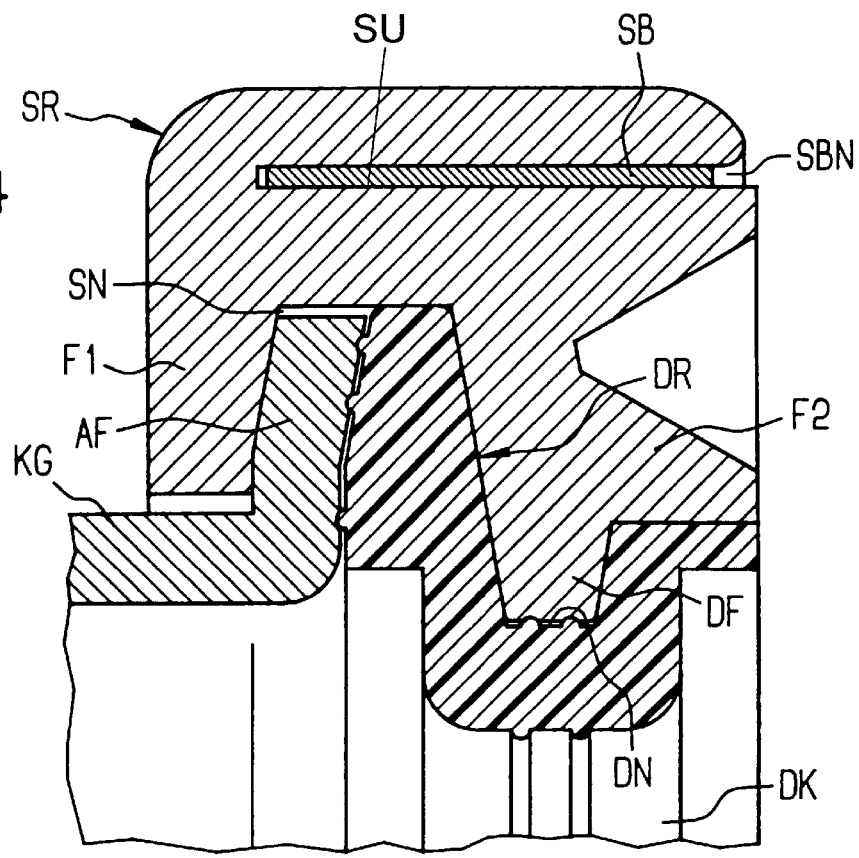

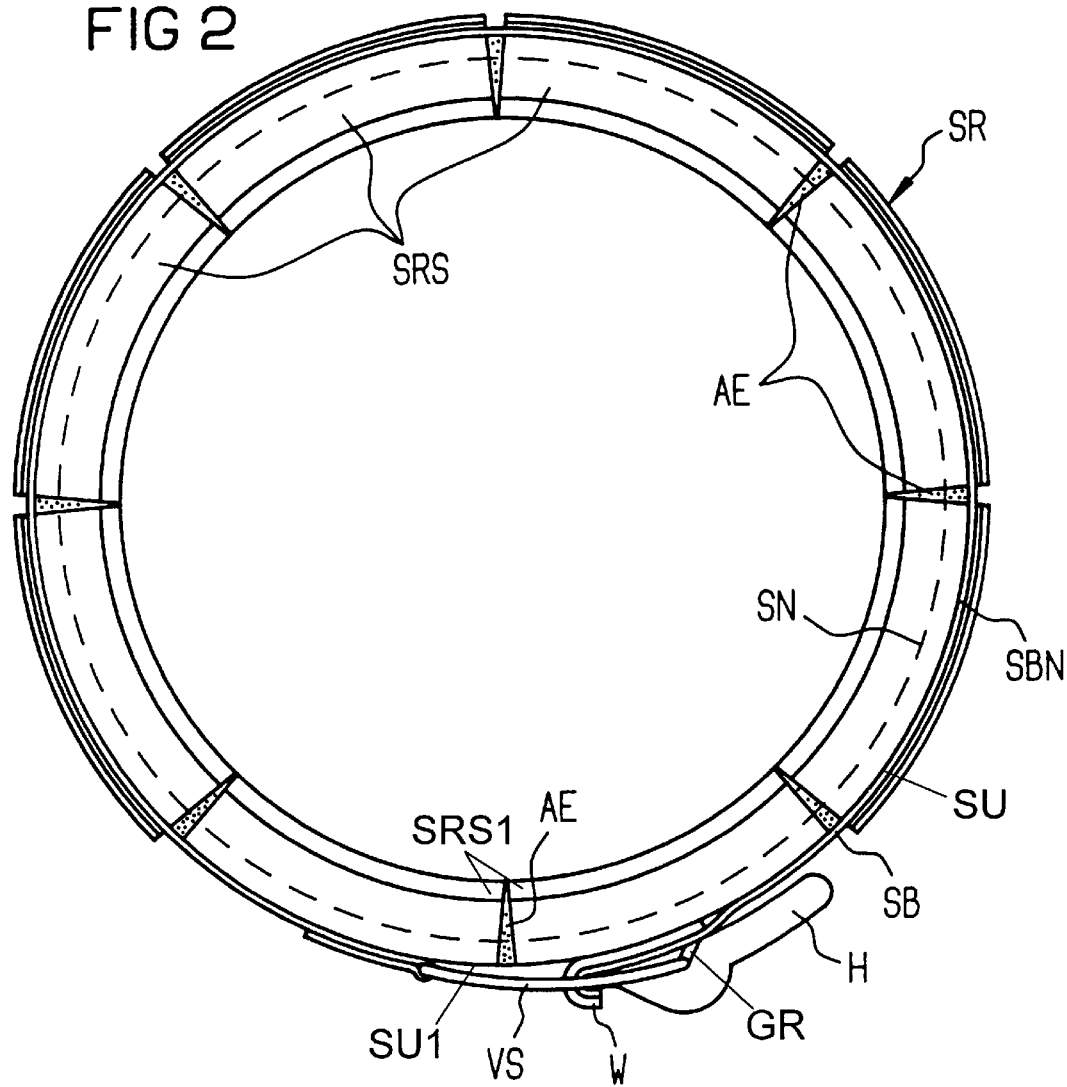
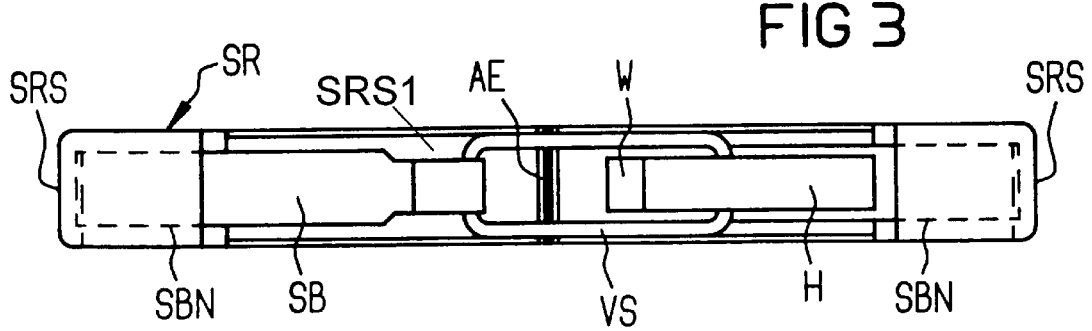

CLAMPING RING FOR FLANGE CONNECTIONS IN CABLE FITTINGS AND PIPES

BACKGROUND OF THE INVENTION

The present invention is directed to a clamping ring for flange connections in a sealing system, and the ring has a ring channel for acceptance of a seal ring and terminating flanges of cable fittings or pipes.

European Patent Application EP 0 236 141-A2 discloses a cable fitting in the form of a hood or dome sleeve, wherein the sealing system, that is closed with the assistance of an encompassing clamping ring, is utilized for closing an open end of the sleeve in collaboration with a seal member.

German Published Application 44 27 513-A1 discloses a clamping ring for flange connections, wherein the flanges of the cable fitting to be sealed are pressed together by being encompassed in a channel of the clamping ring. The clamping ring comprises radially outwardly directed incisions which extend from an inner radial surface toward a base of a channel floor of the encompassing channel. A certain shape matching, thus, will occur during tightening due to these incisions or notches.

The problem, which occurs in previous types of clamping ring closures, is that the inserted seal is distorted when closing the clamping ring. For example, the seal is stretched at some locations of the sealing region and crushed and compressed at other locations, which locations are dependent on the structure, so that different loads are set in the sealing system. This especially occurs in sealing systems that are in direct communication with the clamping ring. Losses of tightness will then occur at the locations of these distortions.

SUMMARY OF THE INVENTION

An object of the present invention is to prevent the warping and/or distortion of a sealing ring inserted in a sealing system during the closing operation and, thus, to prevent the occurrence of irregularities over the circumference of the sealing system.

This object is inventively achieved with a clamping ring having a channel for engaging flanges of the cable fittings or pipes, which has the improvement in that the ring is formed by a plurality of ring segments and in that the ring segments are embraced by a strap retainer.

The advantage of the clamping ring of the present invention is that the pressing of the inserted seal ring occurs only radially, so that different dilatations or compressions no longer exist in the circumferential zone of the sealing ring. To this end, such a clamping ring is divided into individual ring segments that are movable relative to one another and are embraced by a strap retainer at the outside. Only a radially inwardly directed movement of the individual ring segments occurs due to the influence of the outwardly disposed strap retainer and a movement in the circumferential direction is suppressed. A dilatation or compression in the circumferential direction is thereby no longer possible and the seal ring is uniformly pressed inward onto the sealing surfaces in a radial direction.

Other advantages and features of the invention will be readily apparent from the following description of the preferred embodiment, the drawings and claims.

BRIEF DESCRIPTION OF THE DRAWINGS

FIG. 1 is a side view of a clamping ring of the prior art;

FIG. 2 is a side view of a clamping ring in accordance with the present invention;

FIG. 3 is a bottom elevational view of the clamping ring of FIG. 2; and

FIG. 4 is a cross sectional view through a sealing system of a cable fitting utilizing the clamping ring of the present invention.

DESCRIPTION OF THE PREFERRED EMBODIMENT

A two-part clamping ring of the prior art is generally indicated at SRST in FIG. 1. The two-part clamping ring has halves SH1 and SH2, which are connected to one another by an articulation G at one end and the halves SH1 and SH2 are urged together by a clamping element SE that is introduced into the closure flanges VF of the two halves SH1 and SH2. Each of the halves SH1 and SH2 has a clamping ring channel SNST. When the ring halves SH1 and SH2 are swivelled or drawn together, a dilatation and compression that can lead to irregularities and losses of the tightness in a sealing zone are produced in a seal ring placed in the clamping ring channel SNST of the clamping ring SRST.

The principles of the present invention are particularly useful when incorporated in a clamping ring, generally indicated at SR in FIGS. 2, 3 and 4. The clamping ring SR acts on a sealing system and is divided into a plurality of ring segments SRS that are guided movably relative to one another. Compensation elements AE or guide elements are arranged loosely in the spaces between the individual ring segments. The elements AE may be either individual discrete elements which are inserted in the spaces or they may be attached to the end of a segment. These elements AE are preferably resilient elements.

To hold the segments together and to urge them radially into a clamping arrangement, a retaining strap SB, that acts uniformly radially inward on the individual segments SRS by being tightened, is then guided on the outside of the segments. As a result thereof, the ring segments SRS are uniformly placed and drawn together in a radial direction on a sealing ring or flange DR of the seal member DK and the flange DR is introduced in the ring channel SN. In this way, a dilatation or compression of the seal ring or flange can no longer occur, so that irregularities of this type no longer occur in the sealing zone. As a result, the individual sealing condition prevails over the entire circumference of the ring.

The strap retainer SB can be put in place either on an outer circumferential surface of the individual ring segments SRS or can be pulled in a specific strap retainer channel SBN of the ring segment SRS, which is best illustrated in FIG. 4. The strap retainer is preferably held captive in position, so that the basic shape of the clamping ring SR is already obtained. Assembly is significantly facilitated in this way. The strap retainer is tightened by means for tightening, which is illustrated as a lever lock H, which has a groove GR which receives an end of a closure loop VS of the strap retainer SB and has an end which is received into a hook-shaped abutment W attached to the other end of the retainer SB. While this lever lock acts as an over-center toggle to tighten the closure, other known tightening means or devices, for example clamp closures or screw-type closures, wherein the screw element acts on a supporting element, are also possible.

The strap retainer SB is guided in an encompassing strap retainer channel SBN that is open at one side and entered into the individual ring segments SRS, as a result whereof the guidance of the individual ring segments SRS in the basic shape are already established. It should be noted that two of the segments SRS1, as illustrated in FIGS. 2 and 3, are free of the channel SBN, but have an outer surface SU1 with the same radial distance from a base of the channel SN as the surface SU of the retainer channel SBN from the base of the channel SN.

As shown in FIG. 3, the strap retainer SB emerges from the strap retainer channels SBN in the retaining or tightening region and is provided with the closure loop VS on the one end and, on the other end, it forms the abutment W. The retainer SB is tightened with the assistance of the lever lock H. The compression elements AE can either be inserted loosely between the ring segments SR or can also be arranged movably and captively at the individual ring segments SRS.

Normally, only the carrier flange AF and the seal ring or flange DR are set in the ring channel SN. However, as illustrated in FIG. 4, a specific embodiment is shown by way of addition and has one side wall F2 of the clamping ring SR lengthened as a ring flange or seal spring DF. The seal spring or flange DF acts in a seal channel DN of the seal member DK of the cable fitting to additionally press the seal member into a sealing relationship. The pressing of the carrier flange AF of the cable fitting KG with the adjacent side wall F1 of the clamping ring SR then occurs in the upper part of the ring channel SN, wherein the clamping ring SR moves radially from the outermost outside into engagement due to the closing of the strap retainer SB. At the same time, the flange or spring DF forces the seal ring or flange DR against the flange AF and an inner surface of the flange DF is engaged in the groove or channel DN of the member DK.

As illustrated in FIG. 4, the strap retainer SB is guided in the strap retainer channel SBN of the clamping ring SR that is open at one side, so that the strap retainer can be laterally introduced.

The ring elements of the invention can be equal in length or can be of different lengths. As a result thereof, an even better matching to the form of the sealing system can occur. The sealing system can be fashioned both circularly as well as with a circumferential shape of an oval or ovate. Therefore, the individual ring segments are adapted according to the shape of the sealing system. The clamping ring channel of the clamping ring, which is composed of individual sub-channels of the ring segments, has a generally fashioned cross section of a truncated V and has lateral side walls, such as F1 and F2, which converge toward each other as they extend inwardly to the floor of the channel.

The clamping ring or the clamping ring segments can be fabricated both of metal as well as of pressure-resistant or tear-resistant plastic.

Although various minor modifications may be suggested by those versed in the art, it should be understood that we wish to embody within the scope of the patent granted hereon all such modifications as reasonably and properly come within the scope of our contribution to the art.

We claim:

1. A clamping ring having a channel for receiving flange connections of a sealing system, said ring comprising a plurality of ring segments with each segment comprising a portion of said channel; a strap retainer for holding the ring segments on the flanges received in the channel; means for tightening the strap retainer to urge the segments radially inward onto the flanges; and an annular sealing member having an outwardly opening groove with a sealing flange extending from one side of the groove, the ring channel of the clamping ring having a pair of side walls converging toward a bottom of the channel and each segment of the channel having a corresponding shape for accepting a carrier flange of a cable fitting and the sealing flange, one side wall of the pair of side walls of the ring channel being longer than the other side wall of the pair of side walls and extending into the groove of the sealing member.

2. A clamping ring according to claim 1, which includes compensation elements bridging parting locations between individual ring segments.

3. A clamping ring according to claim 2, wherein the compensation elements are inserted as separate discrete elements.

4. A clamping ring according to claim 2, wherein the compensation elements are attached to the ring segments.

5. A clamping ring according to claim 2, wherein the compensation elements are resilient elements.

6. A clamping ring according to claim 1, wherein the strap retainer is received on an outside surface of at least one ring segment.

7. A clamping ring according to claim 1, wherein at least some of the ring segments have a strap retaining channel, and at least a portion of the strap retainer is received in said strap retainer channels of said segments.

8. A clamping ring according to claim 1, wherein the strap retainer is held captive in position with the ring segments to form a basic shape, which is dependent on the shape of the sealing system.

9. A clamping ring according to claim 1, wherein the means for tightening the strap retainer includes a lock lever.

10. A clamping ring according to claim 1, wherein the means for tightening the strap retainer comprises a clamp closure.

11. A clamping ring according to claim 1, wherein the means for tightening the strap retainer comprises a screw-type closure acting on support elements.

12. A clamping ring according to claim 1, wherein the ring segments are of equal lengths.

13. A clamping ring according to claim 1, wherein the clamping ring is for a circular closure system and the ring segments are correspondingly segments of a circle.

14. A clamping ring for a flange connection in a sealing system for a fitting having an annular sealing member with a radially extending flange and a terminating flange of a second member, said sealing member having an annular groove, said clamping ring having a ring channel for accepting the flanges, said clamping ring comprising a plurality of ring segments, one side wall of the ring channel of each ring segment being longer than the other side wall and extending into said annular groove, a strap retainer for engaging the ring segments, and means for tightening the strap retainer to radially urge the ring segments inward onto the flanges of the sealing system and radially onto the sealing member.

* * * * *